United States Patent Office 2,927,842
Patented Mar. 8, 1960

2,927,842

CYANAMIDE DERIVATIVES

Allan M. Feldman and Evalyn Frances Hosterman, Greenwich, Conn., assignors to American Cyanamid Company, New York, N.Y., a corporation of Maine No Drawing. Application December 22, 1958
Serial No. 781,859

4 Claims. (Cl. 23—78)

The present invention relates to a novel and straightforward method of preparing metal salts of dicyanamide from the corresponding metal cyanamides.

According to the instant discovery a solution or slurry of a metal cyanamide, such as an aqueous solution of sodium acid cyanamide, is brought into reactive contact with ozone to produce the corresponding metal dicyanamide.

Pursuant to a typical embodiment of the present invention, a water solution containing 4 percent sodium cyanamide by weight and having a pH of about 11.8 is contacted with an ozone-containing gas, preferably by bubbling the gas through the solution, and an aqueous solution containing sodium dicyanamide is produced. The product solution is then neutralized with an acid, such as hydrochloric acid, or the like, and the thus-neutralized solution treated with a water-soluble salt, such as zinc chloride, to precipitate the corresponding water-insoluble zinc dicyanamide.

Among the metal cyanamide reactants contemplated herein are the alkali and alkali metal cyanamides, including ammonium cyanamide, sodium cyanamide, lithium cyanamide, and the like, and the alkaline earth metal cyanamides, including calcium cyanamide, barium cyanamide, and the like, and mixtures thereof. Also, the acid cyanamides of these various metal cyanamides, such as sodium acid cyanamide, potassium acid cyanamide, calcium acid cyanamide, and the like, are suitable for the instant discovery. In addition, impure metal cyanamides, such as technical grade calcium cyanamide containing carbon and calcium oxide impurities, may be employed with very satisfactory results, as will be seen hereinafter.

Any gas containing ozone can be used, e.g., ozonized air, ozonized oxygen, a mixture of ozone and nitrogen, etc., provided that any components in the gas other than ozone are substantially inert toward the metal cyanamide reactant as the reaction proceeds. The amount of ozone in the carrier gas is not critical and may be varied as desired or as conditions may require. Generally, the ozone constitutes from about 0.5 to about 10 percent by weight of the ozone-containing gas, more particularly from about 1 to about 6 percent by weight thereof.

Best results are obtained by carrying the reaction out at a pH above about 6.5, preferably in the pH range of 8 to 12. As the pH is lowered below about 6.5 the reaction is substantially minimized to the point where, at a low pH, such as a pH of 4, reaction essentially ceases.

The process of this invention can be carried out continuously, semi-continuously or by batch technique, and at atmospheric, super-atmospheric or sub-atmospheric pressures.

Although reaction temperatures in the range of about $-10°$ C. to about $50°$ C., or even higher, are suitable, reaction is preferably carried out at a temperature in the range of $0°$ C. to about $25°$ C. It will be noted that as the reaction temperature is increased beyond about $45°$ C., some decomposition of the ozone ot $O_2$ takes place.

While the ratio of ozone reactant to metal cyanamide reactant employed is not critical, a stoichiometric excess of the ozone is generally preferred. However, amounts of ozone substantially above and below stoichiometric quantities can be employed without effecting the nature of the reaction.

The reaction is preferably carried out in a liquid medium comprised or composed of water. However, other liquid media can be used, such as ethyl chloride, carbon tetrachloride, polychlorinated hydrocarbons, fluorotrichloromethane, acetonitrile, propionitrile, acetone, liquid hydrocarbons, and other liquid media known to be resistant to attack and satisfactory for use in ozonization. In addition, other suitable liquid media are methanol, ethanol, and other alcohols, mixtures of these, and mixtures thereof with water in any proportion. The liquid medium preferably is one which is inert during the reaction, i.e., one which is substantially non-reactive with the reactants and with the desired product.

It is not necessary, according to the present invention, that the metal cyanamide be soluble in the liquid medium. While a solution of water-soluble sodium acid cyanamide is readily ozonized as contemplated herein, mixtures or dispersions of liquid media containing insoluble metal cyanamides or only partially-soluble metal cyanamides may be employed.

These dispersions may contain insoluble metal cyanamides in a wide range of concentrations, which concentrations are generally consistent with suitable handling procedures. For example, liquid slurries containing from 0.1 to 50 percent by weight metal cyanamide solids may be readily ozonized pursuant to the teachings of the present invention. While there is no lower limit to the amount of solids which may be present in the liquid medium, the upper limit is generally governed by practical considerations relative to proper mixing of the reactants. In some cases up to about 95 percent by weight or more of undissolved metal cyanamide may be present in the liquid medium.

In the case of metal cyanamides which are soluble in the liquid medium, concentrations in the range of 0.1 percent by weight, or less, to saturation or super-saturation of the medium are suitable. Preferably, concentrations in the range of 2 percent by weight to 50 percent by weight are used.

Admixture of the reactants may be carried out in any suitable manner which provides intimate contact between the ozone or ozone-containing gas and the solution, slurry or dispersion containing the metal cyanamide reactant or reactants. Other than the very efficacious method described above of bubbling ozone through a solution of the metal cyanamide, processes wherein the reactants are intermingled by means of countercurrent sprays or impinging streams are contemplated herein.

Likewise, recovery of the product formed may be brought about by any suitable or conventional means. One method, of course, is that indicated above in the description of a typical embodiment. In the case where the product is substantially insoluble in the liquid medium, recovery thereof by centrifugation, filtration, settling, and the like, may be desirable. On the other hand, conversion of the product thus produced, i.e., either in situ conversion of the product in the reaction mixture or conversion of the product subsequent to separation thereof from the reaction mixture, to a corresponding metal salt of dicyanamide may be effected according to conventional means.

The product metal dicyanamides which constitute the subject matter of the present invention may be used as intermediates in the formation of various compounds, as is well known. Furthermore, these salts are excellent durable moth repellents and, when incorporated in paper, reduce embrittlement to a significant degree.

The reaction contemplated herein may be made to take place in any suitable vessel. The runs in Example I, infra, for instance, are conducted in a vertically-disposed 50 cubic centimeter glass tube having an internal diameter of about 20 millimeters. The tube is sealed at its lower end and has two openings in its upper end.

Through one of these openings is placed a second tube having an internal diameter of about 4 millimeters, this tube being concentrically-disposed within the larger tube and extending to a point within about one-quarter of an inch from the bottom thereof. These tubes, therefore, define an annular space therebetween. The smaller tube, furthermore, is open at its upper end, has a sintered glass frit at its lower end, and is in sealed engagement with the larger tube at its point of entry into the larger tube.

The second opening has a diameter of about 10 millimeters and has an open-end sidearm tube contiguous therewith which extends laterally from the larger tube. The sidearm, in turn, has an internal diameter of about 4 millimeters.

The present invention will best be understood by reference to the following illustrative examples:

EXAMPLE I

In each of the runs carried out under the conditions given in Table I, below, 25 cubic centimeters of an aqueous metal cyanamide mixture is placed in the larger tube of the apparatus just described above and an ozone-containing gas is introduced into the mixture via the smaller concentric tube and sintered glass frit at the rate of 0.2 liter per minute. The solution is externally cooled and maintained at a temperature of 0° C. by means of an ice bath in which the larger tube rests.

Effluent gases are removed through the sidearm referred to above and passed directly through a trap containing 200 cubic centimeters of aqueous potassium iodide solution having a concentration of 33 grams KI per liter to determine the extent of reaction, i.e., the KI solution is titrated to determine unreacted $O_3$. When a significant amount of $O_3$ appears in the effluent gas the reaction is substantially complete.

In each of runs 1–9 of Table I, the reaction product mixture is treated, according to conventional means, with concentrated ammonia and silver nitrate, and the resulting yellow precipitate of silver cyanamide is filtered off. This precipitate is then titrated to determine the amount of unreacted metal cyanamide in the reaction product mixture.

The filtrate, in turn, is acidified with nitric acid to convert the metal dicyanamide product therein (sodium dicyanamide in the case of runs 1–8, and calcium dicyanamide in the case of run 9) to its corresponding water-insoluble silver salt which precipitates out of solution.

Table I, which follows, is otherwise self-explanatory:

Table I

| Run No. | Reaction Conditions | | | | | | Product Analysis | | | |
|---|---|---|---|---|---|---|---|---|---|---|
| | NaHNCN, percent by weight in aqueous solution | pH of solution or slurry at 25° C. | NaHNCN, millimoles | Ozone ($O_3$), percent by volume in— | | Reaction Temperature, °C. | Ozone ($O_3$) Reacted, millimoles | $Ag_2NCN$ corresponding to unreacted NaHNCN (millimoles) | $AgN(CN)_2$, millimoles | Percent [1] Conversion of NaHNCN |
| | | | | air | oxygen | | | | | |
| 1 | 10 | | 12.34 | 3 | | 0 | 7.21 | 4.13 | 3.32 | 81.0 |
| 2 | 32 | | 146.96 | 3 | | 0 | 24.72 | 101.75 | 15.06 | 66.6 |
| 3 | 4 | 11.8 | 12.34 | | 6 | 0 | 1.005 | 11.13 | 0.56 | 97.8 |
| 4 | 4 | 11.8 | 12.34 | | 6 | 0 | 2.062 | 9.50 | 1.03 | 72.4 |
| 5 | 4 | 11.8 | 12.34 | | 6 | 0 | 5.11 | 6.15 | 2.12 | 68.6 |
| 6 | 4 | 11.8 | 12.34 | | 6 | 0 | 7.987 | 2.90 | 3.16 | 67.2 |
| 7 | 4 | 11.8 | 12.34 | | 6 | 0 | 10.62 | 1.54 | 3.32 | 61.0 |
| 8 | 4 | 11.8 | 12.34 | | 6 | 0 | 20.83 | 0.02 | 4.92 | 79.8 |
| 9 [2] | 4 | 11.10 | 3.98 | 3 | | 0 | 2.78 | 0.92 | 1.03 | 66.0 |

[1] Computed basis following equation: $2NaHNCN \rightarrow NaN(CN)_2$.
[2] In run #9 an aqueous slurry containing 4 percent by weight of an impure mixture (about 31.8 percent by weight of the mixture comprising CaNCN and the rest essentially carbon and calcium oxide as major impurities) is employed in lieu of sodium cyanamide. Consequently, product analysis is for calcium dicyanamide rather than sodium dicyanamide.

EXAMPLE II

Ten grams of sodium acid cyanamide (123.4 millimoles by analysis) in 100 milliliters of water is reacted at ambient temperature (23° C.–26° C.) with 126.4 millimoles of $O_3$ in air (0.855 millimole of $O_3$ per liter of ozonized air). Reaction is made to take place by bubbling the ozonized air at the rate of 0.2 liter per minute through a pool of the aqueous sodium acid cyanamide solution in a gas washing bottle. A total of 152 liters of the ozone-containing gas (about 130 millimoles of $O_3$) is bubbled through the aqueous solution, and the effluent from the reaction zone analyzes for 4.6 millimoles of unreacted $O_3$.

A 10-milliliter aliquot of the aqueous reaction product mixture is evaporated to dryness at 30° C. in an evaporator and an infra red spectrum reveals the characteristic absorption bands of sodium dicyanamide.

While the present invention has been described in detail with respect to certain typical and specific embodiments thereof, it is not intended that these limitations exert undue restrictions upon the scope of the invention, excepting, of course, insofar as these details appear in the appended claims.

What is claimed is:
1. The method which comprises establishing a mixture of an inert liquid and a metal cyanamide selected from the group consisting of alkali cyanamide, and alkaline earth metal cyanamide, and their acid cyanamides, and intimately contacting said mixture having a pH above about 6.5 with a gas comprised of ozone as an essential component to produce the corresponding metal dicyanamide.
2. The method of claim 1 wherein the inert liquid is water.
3. The method of claim 1 wherein the mixture is a solution of sodium acid cyanamide in water.
4. The method of claim 1 wherein the metal cyanamide is calcium cyanamide.

References Cited in the file of this patent
UNITED STATES PATENTS 2,357,261     Kaiser _____ Aug. 29, 1944
2,562,869     Nagy _____ July 31, 1951